United States Patent [19]
Paneth et al.

[11] Patent Number: 6,081,502
[45] Date of Patent: Jun. 27, 2000

[54] METHOD AND APPARATUS FOR REDUCING PROBABILITY OF CLIPPING

[75] Inventors: Eric Paneth, Givataim; Ilan Reuven, Ramat Gan, both of Israel

[73] Assignee: Orckit Communications Ltd., Tel Aviv, Israel

[21] Appl. No.: 08/932,927

[22] Filed: Sep. 18, 1997

[51] Int. Cl.[7] ............................. H04J 11/08; H04J 3/12
[52] U.S. Cl. ........................ 370/210; 370/484; 370/526
[58] Field of Search ..................... 370/210, 203, 370/208, 480, 481, 482, 484; 375/335, 336, 259, 260, 296, 347, 350, 261, 264, 287, 295, 340, 346, 348, 349, 370, 40, 203, 208

[56] References Cited

U.S. PATENT DOCUMENTS

| | | |
|---|---|---|
| 5,461,640 | 10/1995 | Gatherer . |
| 5,471,464 | 11/1995 | Ikeda ........................................ 370/19 |
| 5,623,513 | 4/1997 | Chow et al. . |
| 5,726,974 | 3/1998 | Kunieda et al. ........................ 370/206 |
| 5,768,318 | 6/1998 | Mestdagh ................................ 375/296 |
| 5,790,784 | 8/1998 | Beale et al. ......................... 395/200.01 |
| 5,835,536 | 11/1998 | May et al. ............................... 375/316 |

FOREIGN PATENT DOCUMENTS 2188509  9/1987  United Kingdom .

OTHER PUBLICATIONS

R.W. Chang, Synthesis of Band–Limited Orthogonal Signals for Multi–Channel Data Transmission, Bell–Syst. Tech. Journal, pp. 1775–1796, Dec. 1996.

A.E. Jones et al., Block Coding Scheme For Reduction of Peak to Mean Envelope Power Ratio of Multicarrier Transmission Schemes, Electronics Letters, vol. 30, No. 25, pp. 2098–2099, Dec. 8, 1994.

S.J. Shepherd et al., Simple Coding Scheme to Reduce Peak Factor in QPSK Multicarrier Modulation, Electronics Letters, vol. 31, No. 14, pp. 1131–1132, Jul. 6, 1995.

A Method to Reduce the Probability of Clipping in DMT–Based Transceievers, D.J.G. Mestdagh and P.M.P. Spruyt, IEEE Transactions On Communications, vol. 44, No. 10, pp. 1234–1238, Oct. 1996.

W. Y. Chen et al., High Bit Rate Digital Subscriber Line, IEEE Journal On Selected Areas In Communications, vol. 9, No. 6, Aug. 1991.

*Primary Examiner*—Alpus H. Hsu
*Assistant Examiner*—Duc Ho
*Attorney, Agent, or Firm*—Darby & Darby

[57] ABSTRACT

A method for reducing probability of clipping in an IFFT-based (inverse fast Fourier transform based) multitone communication transmitter, the method including applying an IFFT to an original sequence thereby to generate an IFFT output sequence, if the IFFT output sequence fits a predetermined clipping profile, applying at least one transformation to the IFFT output sequence, thereby to define a transmitted sequence, the transformation-applying step including decomposing the IFFT output sequence into a first component sequence and a second component sequence, rearranging at least one of the first and second component sequences with respect to the other, thereby to define third and fourth component sequences, and combining the third and fourth component sequences into a final output sequence.

51 Claims, 8 Drawing Sheets

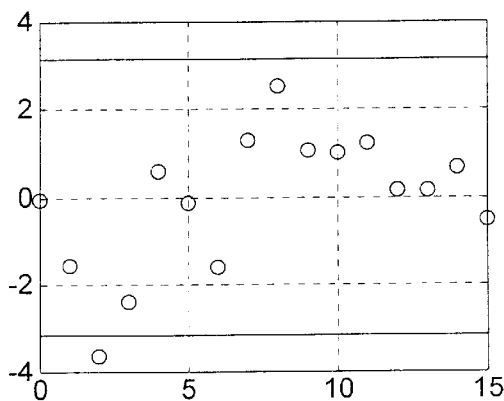
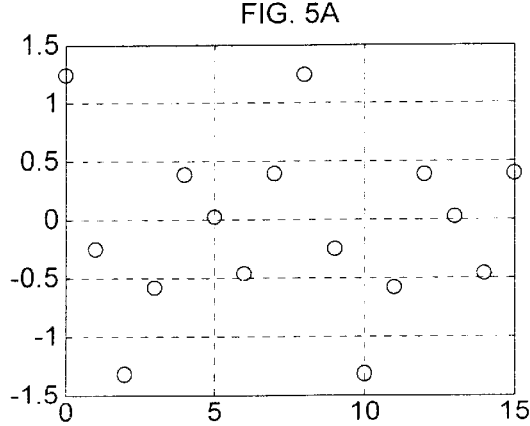
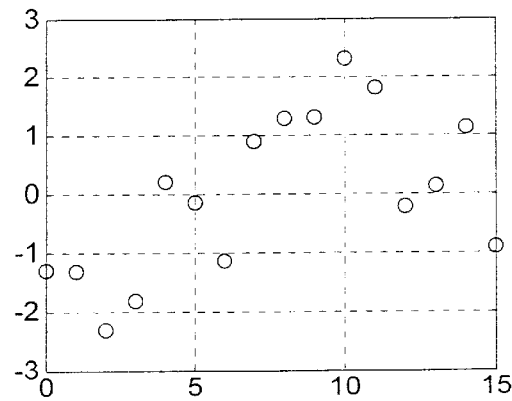

METHOD AND APPARATUS FOR REDUCING PROBABILITY OF CLIPPING

FIELD OF THE INVENTION

The present invention relates to apparatus and methods for reducing the need for clipping in multi-carrier based transmission systems.

BACKGROUND OF THE INVENTION

Discrete Multitone Modulation (DMT), also known as multicarrier modulation or Orthogonal Frequency-Division Multiplexing (OFDM) has been proposed in recent years for applications of transmission of data over severely distorted channels. For instance, this transmission technique has been adopted by ANSI T1E1.4 as the standard technique for the ADSL application.

A multicarrier transceiver divides the available channel bandwidth into a plurality of relatively narrow-band subchannels. These channels are equally spaced across the system bandwidth. Data are transmitted over each subchannel independently of the others. When the transmitter obeys some suitable orthogonal conditions and thus avoids interference between adjacent channels, and the subchannels are sufficiently narrow, then Inter Symbol Interference (ISI) across the subchannel bandwidth is significantly reduced. These conditions date back to R. W. Chang, "Synthesis of band-limited orthogonal signals for multi-channel data transmission," Bell Syst. Tech. Journal, pp. 1775–1796, December 1966. The DMT transmitter can tune the data rate and the transmission power over the individual subchannels according to their transmission characteristics and hence to optimize the system performance.

The transmitted data in a multi-carrier system is grouped in so-called symbols. Each symbol represents a defined time-period and a total number of bits. The bits within a symbol are allocated to the different subchannels. The bits being conveyed over each subchannel are modulated generating a so-called frequency domain vector. This vector includes coordinate sequences representing the constellation point that corresponds to each channel. The coordinates may be drawn for example from a QAM constellation.

The DMT signal is generated by means of a vector frequency-to-time transformation on the plurality of independent frequency-domain coordinates. The common transformation used is the Inverse Fast Fourier Transform (IFFT). Each entry of the IFFT sequence is a sum with a constant phasor shift of all the frequency-domain coordinates. Consequently, the resulting time-domain signal exhibits a high peak-to-average ratio.

This fact in turn has a major impact on the design requirements of the analog circuitry of the DMT transmitter. Statistically, the large amplitude spikes are very rare and in a practical transceiver, when the signal amplitude exceeds the maximum input value of a D/A converter, the output signal is clipped to this threshold level. This operation results in a distorted transmitted signal and it degrades the system performance. Several methods are now described which are regarded as reducing the probability of clipping events in DMT-based systems.

One possible technique to reduce the peak-to-average ratio is to employ pre-coding of the input data. This method requires an appreciable increase of the transmitted line rate and consequently it reduces the energy per data bit and deteriorates performance.

Another method to reduce the peak-to-average ratio is to decrease the amplitude of the entire sequence of samples corresponding to a symbol by a predetermined factor when at least one sample in this sequence is clipped. This technique requires only a few additional bits per symbol to convey the information regarding the "reduction factor" used. Evidently this increase is insignificant. However, the reduction of the transmit power increases the vulnerability of the system to noise and thus it degrades the system performance.

A third method which was proposed very recently employs a properly chosen phasor transformations of the QAM modulated carriers and a plurality of IFFT operations. This method does not degrade the system performance but it entails a significant additional complexity of the DMT transceiver since it accommodates several IFFT computations per symbol period.

The three methods mentioned above are described in detail in references 1 and 2, 3, and 4, respectively:
1. "Block coding scheme for reduction of peak to mean envelope power ratio of multicarrier transmission schemes", A. E. Jones et al., Electronics letters, Vol. 30, No. 25, pp. 2098–2099, Dec. 8th 1994.
2. "Simple coding scheme to reduce peak factor in QPSK multicarrier modulation", S. J. Shepherd et al, Electronics Letters, Vol. 31, No. 14, pp. 1131–1132, Jul. 6th, 1995.
3. U.S. Pat. No. 5,623,513 to Chow et al, and
4. "A method to reduce the probability of clipping in DMT-based transceivers", D. J. G. Mestdagh and P. M. P. Spruyt, IEEE Transactions on Communications, Vol. 44, No. 10, pp. 1234–1238, October 1996.

The disclosures of all publications mentioned in the specification and of the publications cited therein are hereby incorporated by reference.

SUMMARY OF THE INVENTION

The present invention relates to generally lossless apparatus and methods for reducing the need for clipping in multi-carrier based transmission systems.

In the present application, the term "lossless" is used to denote a transformation that does not increase the susceptibility of a communication system to noise.

The present invention seeks to provide improved apparatus and methods to reduce the probability of clipping occurrence in a multi-carrier based system. Several IFFT computations are preferably avoided by using several transformations of the sample sequence available at the output of the IFFT machine. These transformations may be realized with a reduced complexity in comparison with the methods which perform the transformations on the time-domain vector.

Similarly to some prior art methods of reducing clipping, the methods and apparatus shown and described herein hardly increase the actual transmission rate. Another advantage of a preferred embodiment of the present invention is that the inverse process in the receiver is very simple. The inverse transformations in the receiver are preferably carried out on the frequency-domain vector generated by the FFT.

According to a preferred embodiment of the present invention, the samples are decomposed into two distinct sequences. One sequence carries the information identified with the even-numbered frequency carriers and the second stream corresponds to the information transported over the odd-numbered frequency carriers.

There is thus provided, in accordance with a preferred embodiment of the present invention, a method for reducing probability of clipping in an IFFT-based (inverse fast Fourier transform based) multitone communication transmitter, the method including applying an IFFT to an original sequence thereby to generate an IFFT output sequence, if the IFFT output sequence fits a predetermined clipping profile, applying at least one transformation to the IFFT output sequence, thereby to define a transmitted sequence, the transformation-applying step including decomposing the IFFT output sequence into a first component sequence and a second component sequence, rearranging at least one of the first and second component sequences with respect to the other, thereby to define third and fourth component sequences, and combining the third and fourth component sequences into a final output sequence.

Further in accordance with a preferred embodiment of the present invention, the step of rearranging includes translating one of the first and second component sequences with respect to the other along a time axis, thereby to define new component sequences, one of which is translated with respect to one of the first and second component sequences.

Still further in accordance with a preferred embodiment of the present invention, the step of rearranging includes reversing one of the first and second component sequences with respect to the other along a time axis, thereby to define new component sequences, one of which is reversed with respect to one of the first and second component sequences.

Further in accordance with a preferred embodiment of the present invention, the step of rearranging also includes reversing one of the new component sequences relative to the other.

Still further in accordance with a preferred embodiment of the present invention, the step of rearranging also includes translating one of the new component sequences relative to the other.

Additionally in accordance with a preferred embodiment of the present invention, the first component includes first initial and first subsequent subsequences of samples of equal length and the values of the first initial subsequence of samples are respectively equal to the values of the first subsequent subsequence of samples, wherein the second component includes second initial and second subsequent subsequences of samples of equal length and wherein the values of the second initial subsequence of samples are respectively additive inverses of the values of the second subsequent subsequence of samples.

Also provided, in accordance with another preferred embodiment of the present invention, is a method for reducing probability of clipping in an IFFT-based (inverse fast Fourier transform based) multitone communication transmitter, the method including applying an IFFT to an original sequence thereby to generate an IFFT output sequence, and, if the IFFT output sequence fits a predetermined clipping profile, applying at least one transformation, having an inverse transformation, to the IFFT output sequence, thereby to define a final sequence for transmission characterized in that the original sequence is recovered by first applying an FFT to the final sequence as received, thereby to generate an FFT output and subsequently applying the inverse transformation, to the FFT output.

Also in accordance with a preferred embodiment of the present invention is a method for reducing probability of clipping in an IFFT-based (inverse fast Fourier transform based) multitone communication transmitter, the method including: at a transmitting end, applying an IFFT to an original sequence thereby to generate an IFFT output sequence, and if the IFFT output sequence fits a predetermined clipping profile, applying at least one transformation, having an inverse transformation, to the IFFT output sequence, thereby to define a final sequence for transmission, and at a receiving end, recovering the original sequence by first applying an FFT to the final sequence as received, thereby to generate an FFT output and subsequently applying the inverse transformation, to the FFT output.

Further in accordance with a preferred embodiment of the present invention, the clipping profile includes an IFFT output sequence having at least one value exceeding a predetermined clipping threshold.

Also provided, in accordance with another preferred embodiment of the present invention, is receiver apparatus including an FFT unit operative to perform an FFT operation on an incoming sequence, thereby to generate an FFT interim sequence, and a recovering transformation unit operative to perform a recovering transformation on the FFT interim sequence, wherein performance of the recovering transformation includes computation of additive inverses of at least a portion of the samples within the FFT interim sequence, thereby to define a new interim sequence in which at least a portion of the samples are replaced by their additive inverses respectively.

Additionally provided, in accordance with another preferred embodiment of the present invention, is receiver apparatus including an FFT unit operative to perform an FFT operation on an incoming sequence, thereby to generate an FFT interim sequence, and a recovering transformation unit operative to perform a recovering transformation on the FFT interim sequence, wherein performance of the recovering transformation includes computation of complex conjugates of at least a portion of the samples within the FFT interim sequence.

Further in accordance with a preferred embodiment of the present invention, the recovering transformation also includes a computation of complex conjugates of at least a portion of the samples in the new interim sequence.

Still further in accordance with a preferred embodiment of the present invention, the portion of samples includes a subsequence of samples within the FFT interim sequence wherein the intervals between the indices of samples within the subsequence are equal.

Further in accordance with a preferred embodiment of the present invention, at least one transformation includes at least one power preserving transformation.

Also provided, in accordance with another preferred embodiment of the present invention, is a method for reducing probability of clipping in an IFFT-based (inverse fast Fourier transform based) multitone communication transmitter, the method including applying an IFFT to an original sequence thereby to generate an IFFT output sequence, and, if the IFFT output sequence fits a predetermined clipping profile, applying at least one power preserving transformation to the IFFT output sequence, thereby to define a transmitted sequence for transmission to a remote terminal.

Further in accordance with a preferred embodiment of the present invention, the transmitted sequence is characterized in that the original sequence is derived from the transmitted sequence by applying an FFT which is an inverse of the IFFT, thereby to define an FFT output sequence, and subsequently performing an inverse of the at least one power preserving transformation on the FFT output sequence.

Still further in accordance with a preferred embodiment of the present invention, the inverse of the at least one power preserving transformation does not include multiplication operations.

Additionally in accordance with a preferred embodiment of the present invention, the inverse of the at least one power preserving transformation includes no addition/subtraction operations other than computation of additive inverses.

Further in accordance with a preferred embodiment of the present invention, the FFT output sequence includes a plurality of FFT output components wherein the inverse of the at least one power preserving transformation includes computation of an additive inverse pertaining to at least one of the plurality of FFT output components.

Additionally in accordance with a preferred embodiment of the present invention, the plurality of FFT output components includes at least one complex FFT output component having an imaginary part and a real part wherein the computation of an additive inverse includes computation of an additive inverse of at least one of the imaginary and real parts.

Further in accordance with a preferred embodiment of the present invention, the transmitted sequence includes a combination of a first permutation of a first component sequence and a second permutation of a second component sequence wherein the first and second component sequences, when combined, yield the IFFT output sequence.

It is appreciated that one of the first and second permutations may be the identity permutation.

Further in accordance with a preferred embodiment of the present invention, the transformation-applying step includes decomposing the IFFT output sequence into a first component sequence and a second component sequence, rearranging at least one of the first and second component sequences with respect to the other, thereby to define third and fourth component sequences, and combining the third and fourth component sequences.

Still further in accordance with a preferred embodiment of the present invention, only one of the first subsequences is stored in memory and only one of the second subsequences is stored in memory.

Further in accordance with a preferred embodiment of the present invention, the if-applying step includes applying first and second transformations to the IFFT output sequence without re-computing the IFFT between application of the first transformation and application of the second transformation.

Still further in accordance with a preferred embodiment of the present invention, the transmitted sequence is characterized in that the original sequence is recovered by first applying an FFT to the transmitted sequence as received, thereby to generate an FFT output, and subsequently applying the inverse transformation, to the FFT output.

Additionally in accordance with a preferred embodiment of the present invention, the first component includes first initial and first subsequent subsequences of samples of equal length wherein the values of the first initial subsequence of samples are respectively equal to the values of the first subsequent subsequence of samples, and wherein the second component includes second initial and second subsequent subsequences of samples of equal length and wherein the values of the second initial subsequence of samples are respectively additive inverses of the values of the second subsequent subsequence of samples.

Still further in accordance with a preferred embodiment of the present invention, the first component includes first initial and first subsequent subsequences of samples of equal length wherein the values of the first initial subsequence of samples are respectively equal to the values of the first subsequent subsequence of samples, wherein the second component includes second initial and second subsequent subsequences of samples of equal length and wherein the values of the second initial subsequence of samples are respectively additive inverses of the values of the second subsequent subsequence of samples.

Still further in accordance with a preferred embodiment of the present invention, the final sequence for transmission includes a version of a comparison sequence generated by operating one of the following transformations: $t_1$, $t_2$, $t_3$, $t_4$, $t_5$, $t_6$, $t_7$ on the IFFT output sequence.

Additionally in accordance with a preferred embodiment of the present invention, the final sequence for transmission includes a first sequence of samples and the comparison sequence comprises a second sequence of samples and the first sequence of samples includes a permutation of the second sequence of samples in which signs of none or all of the samples have been inverted.

Also provided, in accordance with another preferred embodiment of the present invention, is a system for reducing probability of clipping in a multitone communication transmitter, the system including a multichannel modulator operative to generate a preliminary digital output sequence, a transformation unit operative, if the preliminary digital output sequence fits a predetermined clipping profile, to apply at least one invertible non-linear transformation to the preliminary digital output sequence, thereby to define a transmitted sequence, the transformation unit including a decomposer operative to decompose the preliminary digital sequence into a first component sequence and a second component sequence, a sequence rearranging unit operative to rearrange at least one of the first and second component sequences with respect to the other, thereby to define third and fourth component sequences, and a final output sequence generator operative to combine the third and fourth component sequences into a final output sequence.

Further in accordance with a preferred embodiment of the present invention, the transformation includes a plurality of transformations performed respectively on a plurality of subsequences of the preliminary digital output sequence, wherein the plurality of subsequences together forms a partition of the preliminary digital output sequence. One or some of the plurality of transformations may be the identity transformation.

Further in accordance with a preferred embodiment of the present invention, all of the plurality of transformations are linear and at least one transformation from among the plurality of transformations is different from at least one other transformation from among the plurality of transformations.

Also provided, in accordance with another preferred embodiment of the present invention, is a system for reducing probability of clipping in a multitone communication transmitter, the system including a multichannel modulator operative to generate a preliminary digital output sequence, a transformation unit operative, if the preliminary digital output sequence fits a predetermined clipping profile, to apply at least one invertible non-linear transformation to the preliminary digital output sequence, thereby to define a transmitted sequence, the transformation unit including a decomposer operative to decompose the preliminary digital sequence into a first component sequence and a second component sequence, a sequence rearranging unit operative to rearrange at least one of the first and second component sequences with respect to the other, thereby to define third and fourth component sequences, and a final output sequence generator operative to combine the third and fourth component sequences into a final output sequence.

Further in accordance with a preferred embodiment of the present invention, the transformation includes a plurality of transformations performed respectively on a plurality of subsequences of the preliminary digital output sequence, wherein the plurality of subsequences together forms a partition of the preliminary digital output sequence.

Still further in accordance with a preferred embodiment of the present invention, all of the plurality of transformations are linear and at least one transformation from among the plurality of transformations is different from at least one other transformation from among the plurality of transformations.

Further provided, in accordance with another preferred embodiment of the present invention, is a method for reducing probability of clipping in a multitone communication transmitter, the method including generating a preliminary digital output sequence, and, if the preliminary digital output sequence fits a predetermined clipping profile, applying at least one invertible non-linear transformation to the preliminary digital output sequence, thereby to define a transmitted sequence, the if-applying step including decomposing the preliminary digital sequence into a first component sequence and a second component sequence, rearranging at least one of the first and second component sequences with respect to the other, thereby to define third and fourth component sequences and combining the third and fourth component sequences into a final output sequence.

The "additive inverse" of a value a is −a.

The term "power preserving transformation" refers to a transformation which operates on a first sequence and produces a second sequence whose average power is not substantially less than and is preferably identical to the average power of the first sequence.

BRIEF DESCRIPTION OF THE DRAWINGS AND APPENDICES

The present invention will be understood and appreciated from the following detailed description, taken in conjunction with the drawings in which:

FIG. 4 is an illustration of a sequence of information;

FIGS. 5A–5B are illustrations of first and second components respectively to which the sequence of FIG. 4 is decomposed;

Figure 1:
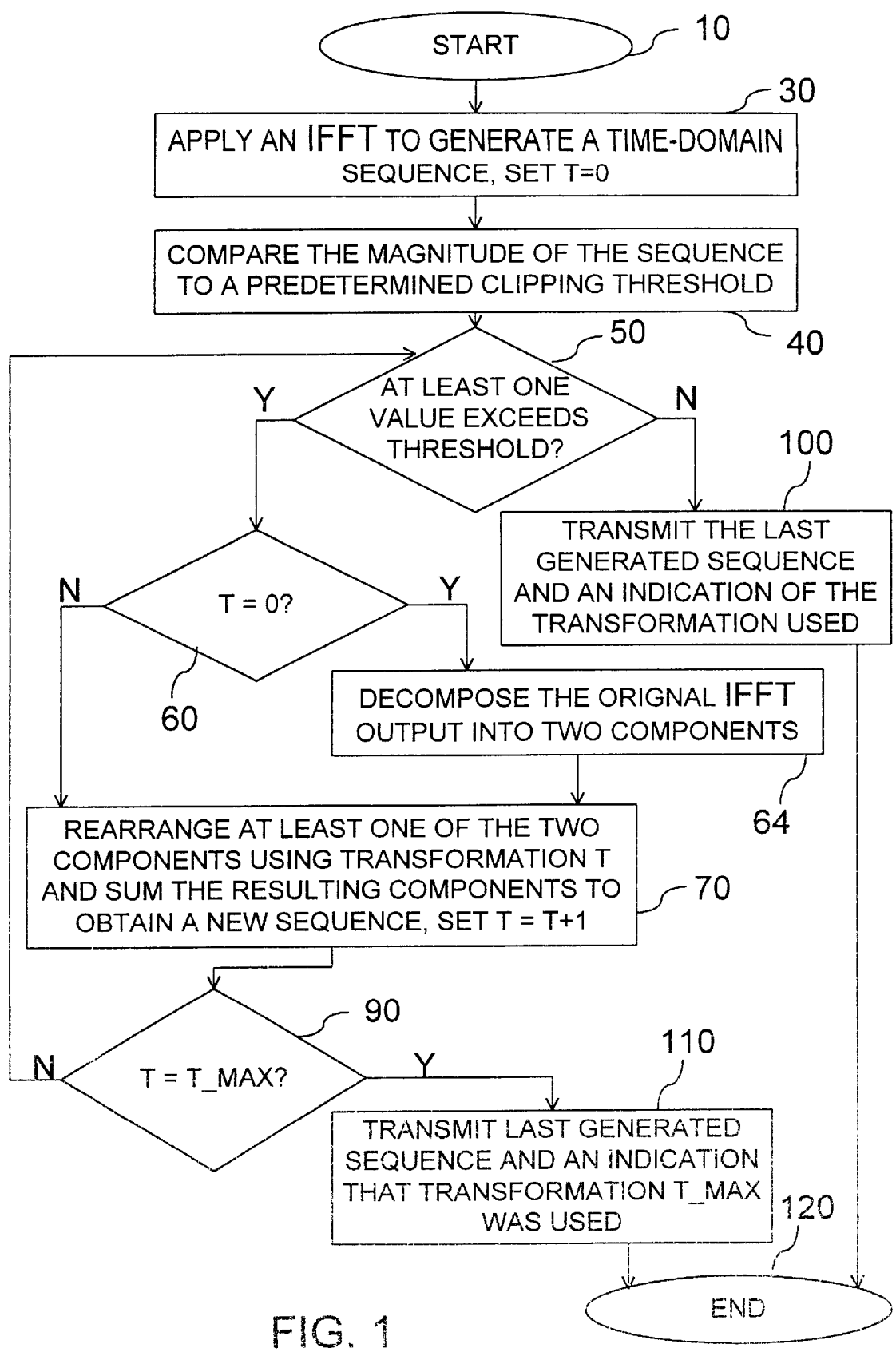
FIG. 1 is a simplified flowchart illustration of a preferred method, performed at a transmitter end of a communication path, for reducing probability of clipping in a message to be transmitted.

Attached herewith is the following appendix which aids in the understanding and appreciation of one preferred embodiment of the invention shown and described herein:

Appendix A is a printout of a Matlab computer simulation of a preferred method for performing the decomposition and rearranging steps of FIG. 1 as well as a performance computation evaluating the extent to which these steps have reduced probability of clipping. Matlab is a trademark denoting a product by The MathWorks, Inc., 24 Prime Park Way, Natick, Mass., 01760-1500, USA.

DETAILED DESCRIPTION OF A PREFERRED EMBODIMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIG. 1 is a simplified flowchart illustration of a preferred method, performed at a transmitter end of a communication path, for reducing probability of clipping in a message to be transmitted. As shown, an IFFT is employed (step 30) to generate a time-domain sequence (also termed herein "the original sequence"). If the sequence does not exceed a predetermined clipping threshold (step 50), it can be transmitted (step 100) together with an indication that the sequence was transmitted without being transformed (i.e. that the identity transformation was operated on the sequence).

However, if the sequence does exceed a predetermined clipping threshold, then the method typically operates one of a predetermined set of transformations on the original sequence in an attempt to find a transformation that prevents clipping for the individual time-domain sequence under consideration. An output derived from the clipping-preventing transformation is transmitted rather than transmitting the sequence. Typically, the clipping threshold is selected such that, generally, clipping will or may occur to an unacceptable degree in sequences which exceeds that threshold.

According to a first embodiment of the present invention, the transformations in the set are tried out one by one until (step 50) a transformation is found which yields a new sequence (step 70) having samples which all fall below the clipping threshold. If such a transformation is found, the new sequence is transmitted together with an indication of the transformation (step 100). If no such transformation is found, the new sequence generated using the last transformation in the set is transmitted together, with an indication that the last transformation was used (step 110).

Any suitable method may be employed to transmit to the receiver an indication of the transformation which was used. For example, a group of bits may be reserved, typically on each transmitted symbol, for this purpose. Alternatively, by using a trellis code which encodes the frequency domain input to the IFFT, the receiver can independently determine the exact transformation which has been used by the transmitter. Typically, this is carried out by performing, at the FFT, all possible inverse transformations and then decoding the resulting outputs. The decoded sequence yielding the highest decoding quality is selected as the "correct" decoded sequence.

Alternatively, the transformations in the set are tried out one by one and as each is tried, it is evaluated for success in preventing clipping by computing a suitable success parameter for the current transformation. The success parameter is typically based on the number of samples exceeding the clipping threshold and/or the degree to which a sample or samples exceed the clipping threshold. If an individual transformation in the set is found to have a success parameter which exceeds the success parameter of the identity transformation, the individual transformation is stored together with its success parameter. If another transformation in the set is found to have an even better success parameter, that transformation is stored whereas the individual transformation which had previously been stored is discarded, and so on, such that once all transformations in the set have been examined, the stored transformation will be that which has the highest success parameter.

In step 64, the original IFFT output f(n) for n=0, ..., N–1, is decomposed into two components.

In the following description N denotes the IFFT/FFT length, f(n) is the time-domain sequence generated in step 30 and the FFT of f(n) is denoted by F(n). That is:

$$F(n) = \sum_{k=0}^{N-1} f(k) \exp(-j2\pi nk/N), \quad n = 0, 1, \ldots, N-1.$$

According to a preferred embodiment of the present invention, only the half of the samples of each of the two components is stored because the components are configured symmetrically or anti-symmetrically such that the other half of the samples is easily recoverable. For example, if the components are N samples long, the first N/2 samples of the first component may be as follows:

$$f_e(n) = \frac{f(n) + f(n+N/2)}{2}, \quad n = 0, 1, \ldots, N/2 - 1.$$

In order to explain the transformations extended sequences, $g_e(n)$ and $g_o(n)$ are defined. The second N/2 samples of the first component may be derived from the first N/2 samples as follows:

$$g_e(n) = \begin{cases} f_e(n), & 0 \le n \le N/2 - 1 \\ f_e(n - N/2), & N/2 \le n \le N - 1 \\ f_e(n \bmod N), & N \le n \end{cases}$$

Similarly, the first N/2 samples of the second component may be as follows:

$$f_o(n) = \frac{f(n) - f(n+N/2)}{2}, \quad n = 0, 1, \ldots, N/2 - 1.$$

The second N/2 samples of the second component may be derived from the first N/2 samples of the second component as follows:

$$g_o(n) = \begin{cases} f_o(n), & 0 \le n \le N/2 - 1 \\ f_o(n - N/2), & N/2 \le n \le N - 1 \\ f_o(n \bmod N), & N \le n \end{cases}$$

It is appreciated that the sum of the two components, $g_e(n)$ and $g_o(n)$ within the range [0, N–1], is exactly f(n).

According to another embodiment of the present invention, a different decomposition, also termed herein "the second decomposition", is employed to generate different first and second components. The second decomposition is as follows:

$$f_r(n) = \frac{f(n) + f(N - n)}{2}, \quad n = 0, 1, \ldots, N/2 - 1.$$

$$f_i(n) = \frac{f(n) + f(N - n)}{2}, \quad n = 0, 1, \ldots, N/2 - 1.$$

Extended signals are again defined:

$$g_r(n) = \begin{cases} f_r(n), & 0 \le n \le N/2 - 1 \\ f_r(N - n), & N/2 \le n \le N - 1 \\ f_r(n \bmod N), & N \le n \end{cases}$$

$$g_i(n) = \begin{cases} f_i(n), & 0 \le n \le N/2 - 1 \\ -f_i(N - n), & N/2 \le n \le N - 1 \\ f_i(n \bmod N), & N \le n \end{cases}$$

For example, the sequence $m_1(n)$ generated by the transformation $$m_1(n) = g_r(n+N/2) + g_i(n)$$

is identical to $t_1(N/2-n)$ where $t_1(n)$ is the sequence generated by the first transformation explained here onwards. Thus when $t_1(n)$ is generated there is no benefit to the use of $m_1(n)$. When $t_1(n)$ is clipped, then the sequence $m_1(n)$ is necessarily clipped as well.

According to still another embodiment of the present invention, yet another decomposition, also termed herein "the third decomposition", is employed to generate different first and second components. The third decomposition is as follows:

Decomposition III $$f_a(n) = \begin{cases} \dfrac{f(n) + f(N/2 - n)}{2}, & n = 0, 1, \ldots, N/4 - 1 \\ \dfrac{f(n) + f(3N/2 - n)}{2}, & n = N/2, N/2 + 1, \ldots, 3N/4 - 1 \end{cases},$$

$$f_b(n) = \begin{cases} \dfrac{f(n) - f(N/2 - n)}{2}, & n = 0, 1, \ldots, N/4 - 1 \\ \dfrac{f(n) - f(3N/2 - n)}{2}, & n = N/2, N/2 + 1, \ldots, 3N/4 - 1 \end{cases}.$$

Extended signals are again defined:

$$g_a(n) = \begin{cases} f_a(n), & 0 \le n \le N/4 - 1, \; N/2 \le n \le 3N/4 - 1 \\ f_a(N/2 - n), & N/4 \le n \le N/2 - 1 \\ f_a(3N/2 - n), & 3N/4 \le n \le N - 1 \\ f_a(n \bmod N), & N \le n \end{cases}$$

$$g_b(n) = \begin{cases} f_b(n), & 0 \le n \le N/4 - 1, \; N/2 \le n \le 3N/4 - 1 \\ -f_b(N/2 - n), & N/4 \le n \le N/2 - 1 \\ -f_b(3N/2 - n), & 3N/4 \le n \le N - 1 \\ f_b(n \bmod N), & N \le n \end{cases}.$$

For example, the transformation that produces the sequence $m_2(n)$, $$m_2(n) = g_a(n+N/2) + g_b(n)$$

is redundant since that the $m_2(n) = t_1(N-n)$. When $t_1(n)$ is clipped, then the sequence $m_2(n)$ is necessarily clipped as well.

It is appreciated that the three particular decompositions shown and described herein are merely examples of possible decompositions and are not intended to be limiting. Of the three decompositions described herein, the first described decomposition is believed to be preferable.

A preferred set of 7 transformations is now described. The restoration of F(n), the FFT of the original IFFT output f(n), from each of the 7 transformations, is also described:

Transformation I (reversing)—Generate the sequence $t_1(n)$ which is defined by $$t_1(n)=g_e(N-n)+g_o(n), \; 0 \leq n \leq N-1.$$

Let $T_1(n)$ denote the FFT sequence of the time-domain sequence $t_1(n)$. The FFT sequence of the original sequence can be recovered from $T_1(n)$ according to the following formula $$F(n) = \begin{Bmatrix} T_1(n), & n \; \text{odd} \\ T_1^*(n), & n \; \text{even} \end{Bmatrix}, 0 \leq n \leq N-1.$$

Where the asterisk (*) stands for the complex conjugate.

If the second sequence, $g_o(n)$, is reversed, the following signal is obtained:

$$\tilde{t}_1(n)=g_e(n)+g_o(N-n)=t_1(N-n).$$

Thus from the viewpoint of the clipping problem, this sequence, $\tilde{t}_1(n)$, is equivalent to the sequence $t_1(n)$ (it is a version of the latter sequence).

Transformation II (shifting by N/4)—Generate the sequence $t_2(n)$ which is defined by $$t_2(n)=g_e(n+N/4)+g_o(n), \; 0 \leq n \leq N-1.$$

Let $T_2(n)$ denote the FFT sequence of the time-domain sequence $t_2(n)$. The FFT sequence of the original sequence can be recovered from $T_2(n)$ according to the following equation $$F(n) = \begin{Bmatrix} T_2(n), & n \; \text{odd} \\ (-1)^{n/2}T_2(n), & n \; \text{even} \end{Bmatrix}, 0 \leq n \leq N-1.$$

The shifted sequence $g_e(n+N/4)$ may be subtracted from the second sequence $g_o(n)$ to produce a version of the sequence $t_2(n)$. Clearly, $g_o(n)-g_e(n+N/4)=-t_2(n+N/2)$.

Transformation III (shifting by N/4 and reversing)—This transformation combines the aforementioned two transformations. It sums the sequence $g_o(n)$ with a modification of the sequence $g_e(n)$. The modified sequence is achieved by reversing the order of the samples within the sequence and shifting it by N/4. The same sequence is obtained both when the shifting precedes the reversing operation and when it follows the reversing operation. This transformation generates the sequence $t_3(n)$ which is defined by $$t_3(n)=g_e(3N/4-n)+g_o(n), \; 0 \leq n \leq N-1.$$

Let $T_3(n)$ denote the FFT sequence of the time-domain sequence $t_3(n)$. The FFT sequence of the original sequence can be recovered from $T_3(n)$ according to the following equation $$F(n) = \begin{Bmatrix} T_3(n), & n \; \text{odd} \\ (-1)^{n/2}T_3^*(n), & n \; \text{even} \end{Bmatrix}, 0 \leq n \leq N-1.$$

Transformation IV (shifting by N/8)—Generate the sequence $t_4(n)$ which is defined by $$t_4(n)=g_e(n+N/8)+g_o(n), \; 0 \leq n \leq N-1.$$

Let $T_4(n)$ denote the FFT sequence of the time-domain sequence $t_4(n)$. The FFT sequence of the original sequence can be recovered from $T_4(n)$ according to the following equation $$F(n) = \begin{Bmatrix} T_4(n), & n \; \text{odd} \\ (-j)^{n/2}T_4(n), & n \; \text{even} \end{Bmatrix}, 0 \leq n \leq N-1.$$

Transformation V (shifting by N/8 and reversing)—This transformation, like Transformation III combines two operations: reversing and shifting. However, unlike Transformation III the two possible operation orders generate distinct sequences. This transformation is defined as a reversing operation that follows a shifting by N/8. Consequently, the time-domain sequence generated by this transformation, $t_5(n)$, is given by $$t_5(n)=g_e(7N/8-n)+g_o(n), \; 0 \leq n \leq N-1.$$

Let $T_5(n)$ denote the FFT sequence of the time-domain sequence $t_5(n)$. The FFT sequence of the original sequence can be recovered from $T_5(n)$ according to the following identity $$F(n) = \begin{Bmatrix} T_5(n), & n \; \text{odd} \\ (-j)^{n/2}T_5^*(n), & n \; \text{even} \end{Bmatrix}, 0 \leq n \leq N-1.$$

Transformation VI (shifting by 3N/8)—Generate the sequence $t_6(n)$ which is defined by $$t_6(n)=g_e(n+3N/8)+g_o(n), \; 0 \leq n \leq N-1.$$

Let $T_6(n)$ denote the FFT sequence of the time-domain sequence $t_6(n)$. The FFT sequence of the original sequence can be recovered from $T_6(n)$ according to the following equation $$F(n) = \begin{Bmatrix} T_6(n), & n \; \text{odd} \\ j^{n/2}T_6(n), & n \; \text{even} \end{Bmatrix}, 0 \leq n \leq N-1.$$

Transformation VII (shifting by 3N/8 and reversing)—This transformation, like Transformation III and Transformation V also combines two operations: reversing and shifting. The result of this transformation which comprises shifting $g_e(n)$ by 3N/8 and reversing the order of the samples thereafter may alternatively be achieved by first reversing the sequence $g_e(n)$ and afterwards shifting it by N/8. The time-domain sequence generated by this transformation, $t_7(n)$, is given by $$t_7(n)=g_e(5N/8-n)+g_o(n), \; 0 \leq n \leq N-1.$$

Let $T_7(n)$ denote the FFT sequence of the time-domain sequence $t_7(n)$. The FFT sequence of the original sequence can be recovered from $T_7(n)$ according to the following equation $$F(n) = \begin{Bmatrix} T_7(n), & n \; \text{odd} \\ j^{n/2}T_7^*(n), & n \; \text{even} \end{Bmatrix}, 0 \leq n \leq N-1.$$

In the above description, the term "version" is used in the following sense:

The sequence $s_1(n)$ $0 \leq n \leq N-1$, is said to be a version of the sequence $s_2(n)$ if there exists a mapping, M, on the index set $I=\{n: 0 \leq n \leq N-1\}$ M: $I \rightarrow I$, such that $s_1(i)=s_2(M(i))$ for any $0 \leq i \leq N-1$ or $s_1(i)=-s_2(M(i))$ for any $0 \leq i \leq N-1$. Evidently, the sequence $s_1(n)$ exceeds a predefined threshold level if and only if $S_2(n)$ also exceeds this same threshold level.

Transformations II–VII all have the effect of shifting by an integer multiple of N/8, however it is appreciated that, alternatively, shifts which are not integer multiples of N/8 may be employed. However, if, for example, a transformation is used whose shift is not an integer multiple of N/8, the inverse of the transformation includes not only addition/subtraction operations but also more complex operations such as multiplication.

Figure 2:
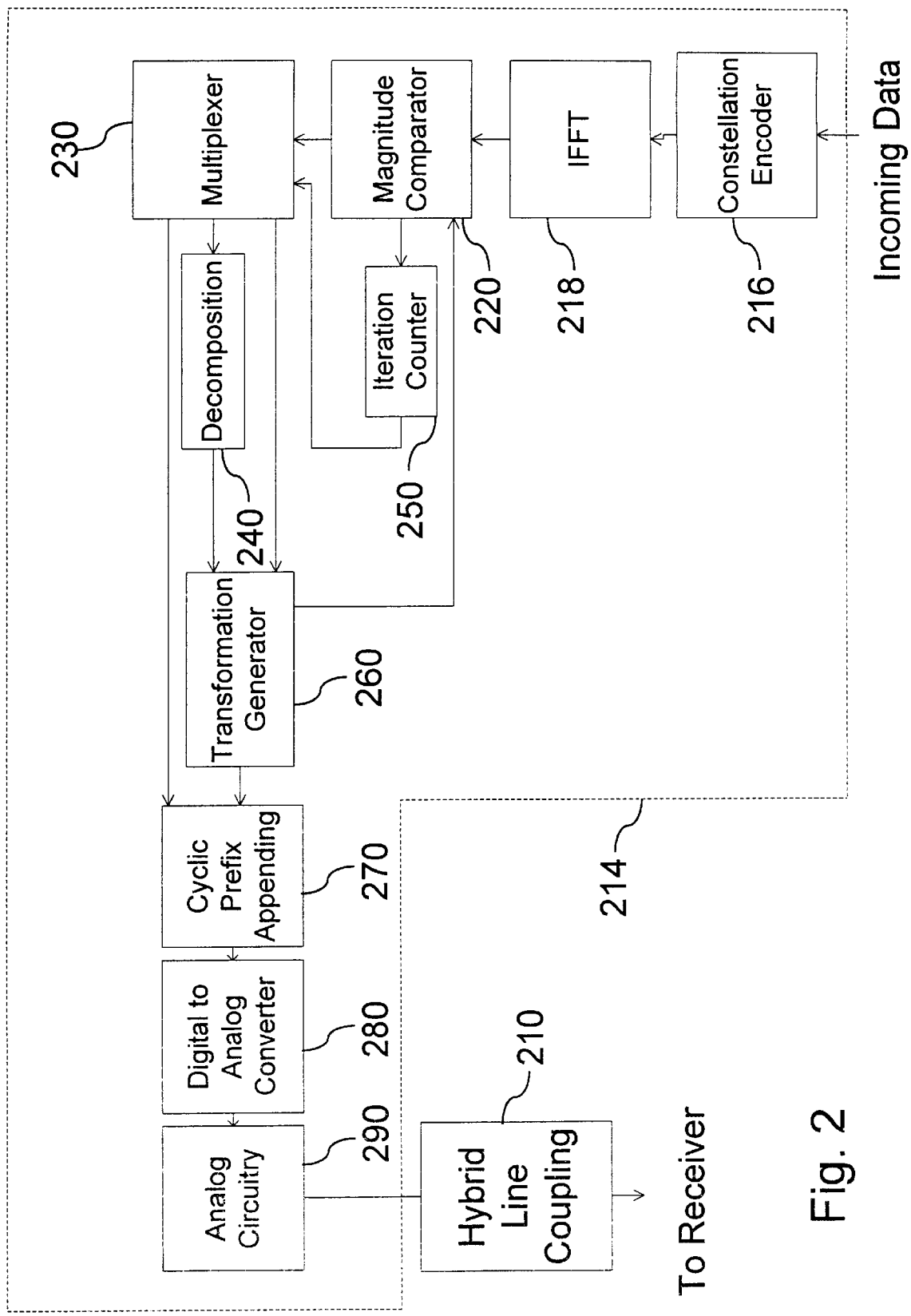
FIG. 2 is a simplified functional block diagram of a transmitter device operative to perform the method of FIG. 1.

FIG. 2 is a simplified functional block diagram of a transmitter device operative to perform the method of FIG. 1. FIG. 2 illustrates a multi-carrier communication system constructed and operative in accordance with a preferred embodiment of the present invention which includes a plurality of transformations intended to reduce the probability of clipping.

The present invention is disclosed using a QAM modulation for the bearer subchannels. However, it is appreciated that alternatively, other modulation techniques can be used such as higher dimensional schemes for each subchannel or for each subchannel pair.

The apparatus of FIG. 2 includes a hybrid line coupling unit 210 linking a transmitter 214 to a channel, for example, a twisted pair wire channel which is used for a bidirectional transmission. The hybrid line coupling unit 210 forwards a transmitted signal to the channel and in the reverse transmission direction it couples the received signal to a receiver such as the receiver of FIG. 3. Considerations for a proper design of a hybrid are well known to persons skilled in the art. An example of such a design is described in W. Y. Chen et al., "High bit rate digital subscriber line," IEEE Journal on Selected Areas in Communications, vol. 9 no. 6, August 1991.

The transmitter 214 preferably includes the following elements:

A Constellation Encoder 216 encodes the data identified with each subchannel independently of the other channels. The encoding may be effected by mapping a bit sequence of each subchannel to a coordinate sequence associated with it. The coordinates are typically taken from a given signal constellation, e.g., a QAM modulation scheme. The frequency-domain vector of coordinate sequences is transformed by unit 218 to a time-domain vector using a suitable frequency-to-time transformation. A prevalent transformation used in multi-carrier systems comprises an IFFT (inverse fast Fourier transform) due to the existence of efficient techniques to implement these transforms.

The resulting time-domain sequence (also termed herein "the original sequence") typically comprises data corresponding to a single symbol period. This sequence is typically forwarded serially to a magnitude comparator 220.

When a pre-defined threshold criterion is reached, e.g. that none of the entries of the time-domain vector (the symbol) exceeds a pre-defined threshold value, this sequence is routed via a multiplexer 230 toward transmission which is performed by cyclic prefix appending unit 270 and D/A converter 280, as described in detail below. If the pre-defined threshold criterion is not reached, e.g. if at least one sample within the symbol exceeds the threshold, then the multiplexer 230 routes the symbol for processing by a pre-computation module, also termed herein "decomposition unit 240". Decomposition unit 240 uses the symbol to provide a different sequence (also termed herein "the modified sequence") typically of substantially equal length. The resulting sequence is fed to transformation generator 260. Transformation generator 260 performs a plurality of modifications on the output of the decomposition unit 240 thereby to generate a corresponding plurality of transformations of the original sequence.

A suitable method of operation for cyclic prefix appending unit 270 is defined in the ANSI ADSL standard, described in "Asymmetric digital subscriber line (ADSL) metallic interface", ANSI T1.413-1995. D/A converter 280 may, for example comprise an Analog Devices AD768AR.

The pre-computation module 240 provides a modified sequence which is preferably stored in the memory device that was used to store the original sequence since the original sequence is not used any further. The computation performed by the pre-computation module is described in detail below and is preferably performed "in-place".

The Transformation Generator 260 performs a given sequence of transformations, one by one, on the modified sequence provided by the decomposition unit 240. Typically, the decomposition unit operates only once, on the first transformation in the sequence, and the result is stored in memory, and starting from the second transformation onward (as counted by iteration counter 250), the multiplexer 230 routes the output of the magnitude comparator 220 directly to transformation generator 260.

7 examples of suitable transformations are described in detail above. The set of the 7 transformations, or any subset thereof, may be employed by the transformation generator 260. Other suitable transformations include suitable translations of any of the 7 transformations described in detail herein. It is appreciated that the transformations forming the sequence of transformations performed by Transformation Generator 260 need not be selected from among the 7 transformations described herein and translations thereof. Any suitable transformations may be employed.

Typically, the new symbol generated by each of the transformations is forwarded to the magnitude comparator 220 and if the sequence fails to meet the threshold criterion, the Transformation Generator 260 proceeds to perform the next transformation. Conversely, when the new symbol meets the threshold criterion, it is typically forwarded to transmission via D/A 280 and analog circuitry 290.

Figure 3:
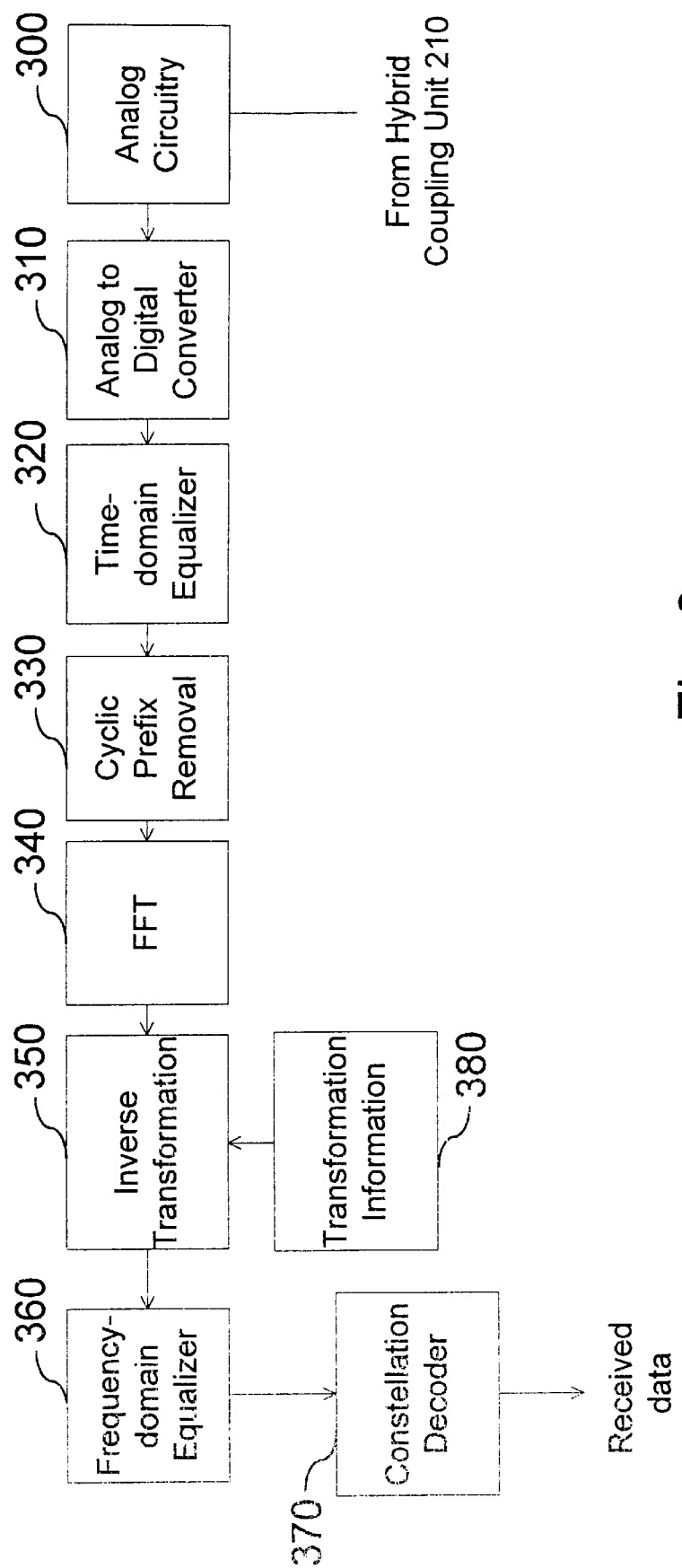
FIG. 3 is a simplified functional block diagram of a receiver device operative to receive a message from the transmitter of FIGS. 1–2.
Figure 6A:
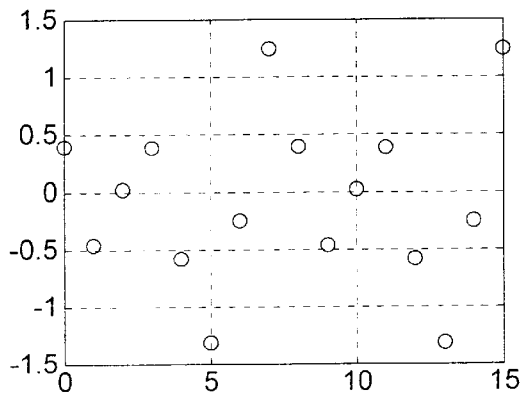
FIGS. 6A–6G are illustrations of results of performing 7 transformations, respectively, on the first component of FIG. 5A.
Figure 6B:
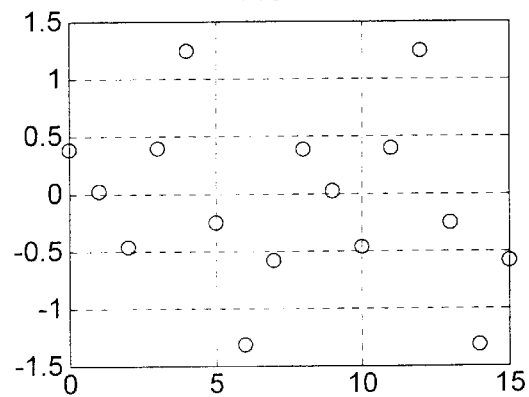
Figure 6C:
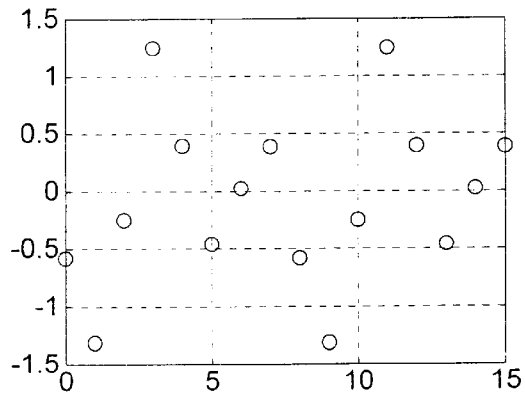
Figure 6D:
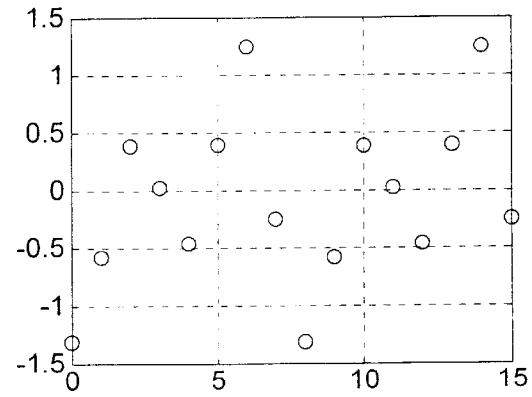
Figure 6E:
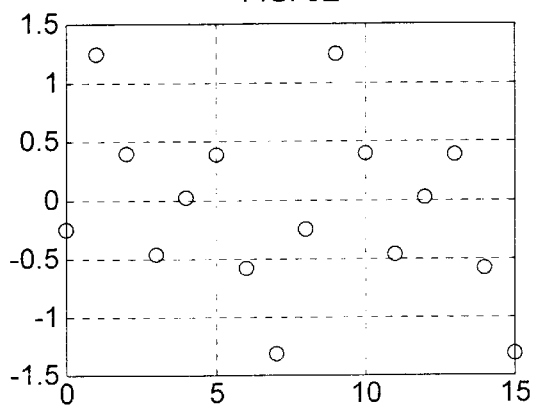
Figure 6F:
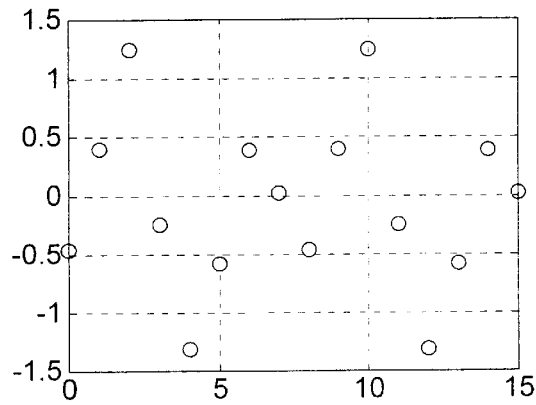
Figure 6G:
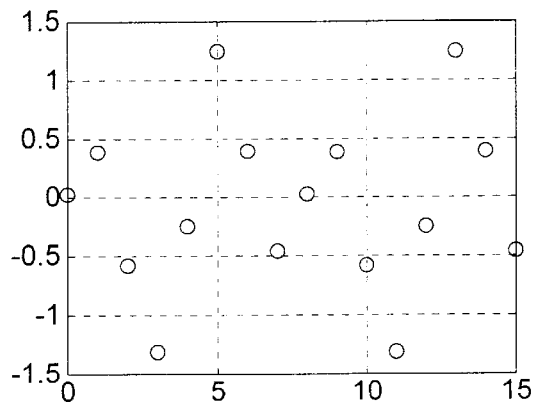
Figure 7A:
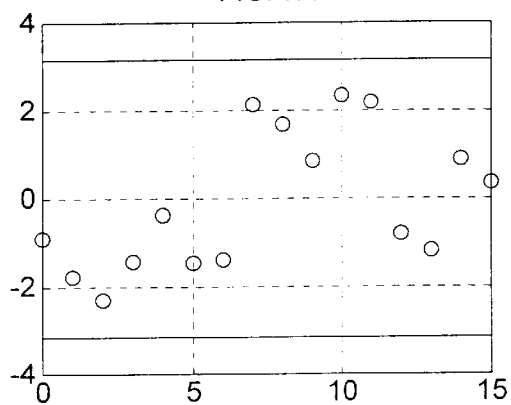
FIGS. 7A–7G are illustrations of results of adding the sequences of FIGS. 6A–6G respectively to the component of FIG. 5B.
Figure 7B:
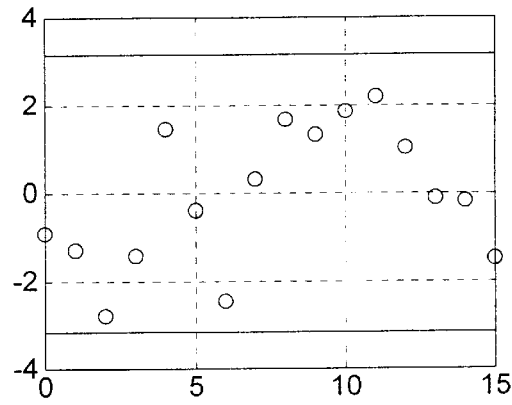
Figure 7C:
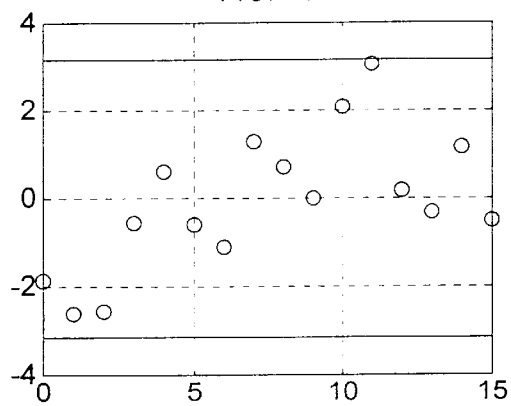
Figure 7D:
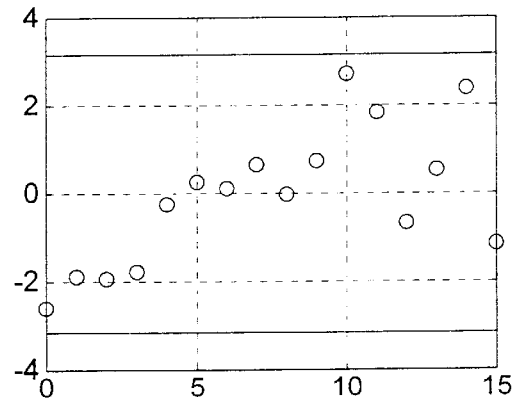
Figure 7E:
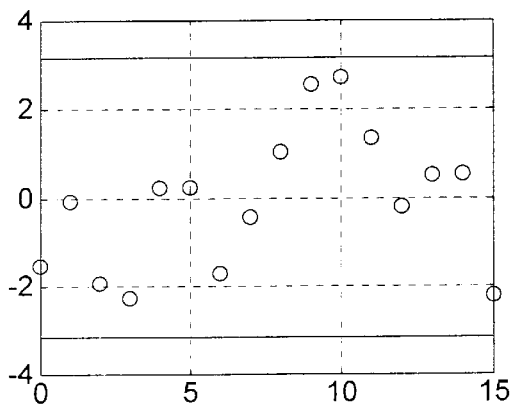
Figure 7F:
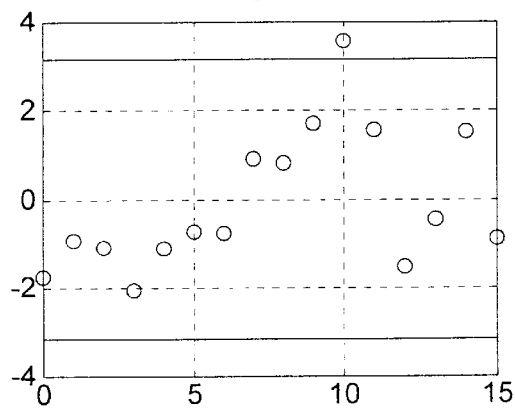
Figure 7G:
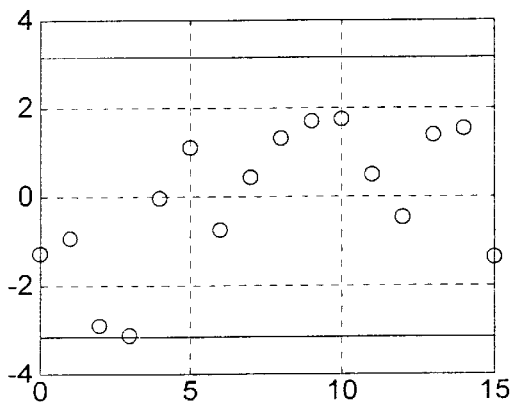

The transformations used by transformation generator 260 and the inverses of these transformations, which are used by the receiver of FIG. 3, are described in detail below. Normally, one of the transformations generates a sequence which is substantially clipping-free, and the probability of clipping is therefore reduced substantially. However, typically, in the rare case that none of the resulting symbols is found to meet the threshold criterion, the symbol provided by the last transformation is nonetheless transmitted.

A Cyclic Prefix Module 270 preferably prefixes to each transmitted symbol a "cyclic prefix", typically comprising a fixed number of last samples of this symbol. The cyclic prefix length is typically determined by the duration of the effective channel response. This repetition of the samples provides a guard period to mitigate the impact of ISI between successive symbols and Inter-Channel Interference (ICI) between adjacent subchannels within the same symbol. When the duration of the effective channel response is not larger than the length of the cyclic prefix then ISI is typically completely eliminated.

The modulated carriers which are summed through the IFFT operation are decomposed at the receiver end as described in detail below with reference to FIG. 3. Similarly, the transformation that was performed on each specific symbol by transformation generator 260 are inverted.

Preferably, the transformations employed by the Transformation Generator are characterized in that they can be inverted after the receiver performs the FFT rather than before. This characteristic simplifies the computational complexity of the receiver considerably.

Preferably, the transformations employed by the Transformation Generator include only addition/subtraction operations and no multiplication operations. The implementation of each transformation typically involves N addition/subtraction operations where N denotes the cardinality of samples within one symbol. The appropriate inverse process realized at the receiver typically does not require additional computations except for sign inversion of some of the frequency-domain samples generated by the FFT.

FIG. 3 is a simplified functional block diagram of a preferred receiver device operative to receive a message from the transmitter of FIGS. 1–2. In the receiver of FIG. 3, the received signal is coupled via the hybrid 210 of FIG. 2 to analog circuitry 300 of the receiver. An A/D converter 310 converts the analog signal to quantized digital samples. A/D converter 310 may, for example comprise an Analog Devices AD9220AR. Typically, a TEQ (time-domain equalizer) 320 is provided which preferably comprises a Finite Impulse Response (FIR) filter, such as an adaptive FIR filter. The TEQ shortens the effective channel response hence enabling the use of a relatively short cyclic prefix. A short cyclic prefix is favorable since that the cyclic prefix reduces the data rate of the system.

Examples of suitable TEQs are described in the following publications:

U.S. Pat. No. 5,461,640 to Gatherer;

J. A. C. Bingham, "Multicarrier modulation for data transmission: an idea whose time has come,", IEEE Communications Magazine, Vol. 28, no. 12, pp. 5–14, December 1990;

J. S. Chow, "Finite-length equalization for multicarrier transmission systems", PhD dissertation, Stanford University, California, USA, June 1992, pp. i–xiii, and 1–168; and Peter J. W. Melsa, R. C. Younce and Charles E. Rohrs, "Impulse response shortening for discrete multitone transceivers", IEEE Trans. on Communications, Vol. 44, No. 12, pp. 1662–1672, December 1996.

The data at the output of the TEQ 320 are typically grouped in blocks of N+M samples where M denotes the length of the cyclic prefix. Cyclic prefix removal unit 330 removes the cyclic prefix and provides length-N sample blocks to an FFT unit 340 which performs the FFT computation on each block. An inverse transformation unit 350 performs the inverse of the transformation employed to send the data from the transmitter of FIG. 2 to the receiver of FIG. 3.

The data at the output of the inverse transformation unit 350 is preferably processed by an FEQ (frequency domain equalizer) which comprises a filter bank operative to compensate for gain and phase distortion of each individual subchannel.

EXAMPLE

FIG. 4 is an illustration of an individual sequence of information including N=16 samples. The threshold criterion in the present example is that all samples should be within a range delimited by clipping thresholds indicated by the solid horizontal lines at vertical locations $10^{0.5}$ and $-10^{0.5}$, respectively. As shown, sample 2 falls beyond the threshold i.e. outside the range. Therefore, the threshold criterion is not met and the method of FIG. 1 is employed.

FIGS. 5A–5B are illustrations of first and second components respectively to which the sequence of FIG. 4 is decomposed using the first decomposition method described herein. As shown, the first component of FIG. 5A comprises first initial and first subsequent subsequences of samples of equal length (samples 0–7 and samples 8–15 respectively). The values of the first initial subsequence of samples (samples 0–7) are respectively equal to the values of the first subsequent subsequence of samples (samples 8–15).

The second component of FIG. 5B comprises second initial and second subsequent subsequences of samples of equal length (samples 0–7 and samples 8–15 respectively). The values of the second initial subsequence of samples (samples 0–7 in FIG. 5B) are respectively additive inverses of the values of the second subsequent subsequence of samples (samples 8–15 in FIG. 5B).

FIGS. 6A–6G are illustrations of output sequences generated by performing the above-described 7 transformations, respectively, on the first component of FIG. 5A.

FIGS. 7A–7G are illustrations of results of adding the output sequences of FIGS. 6A–6G respectively to the component of FIG. 5B. As shown, all of the sequences of FIGS. 7A–7G meet the threshold criterion except for the sequence of FIG. 7F, corresponding to the sixth of the above-described 7 transformations, in which Sample 10 falls above the clipping threshold.

Appendix A is a printout of a Matlab computer simulation of a preferred method for performing the decomposition and rearranging steps of FIG. 1 as well as a performance computation evaluating the extent to which these steps have reduced probability of clipping. Matlab is a trademark denoting a product by The MathWorks, Inc., 24 Prime Park Way, Natick, Mass., 01760-1500, USA.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

---

APPENDIX A randn('seed',sum(100*clock));
N=1000;
Nm=100;
N=N/Nm;

-continued

APPENDIX A

```
n1=0;   % Stores the probability of clipping
        % in the standard receiver.
n=0;    % Stores the probability of clipping in the
        % modified receiver that performs 7 sequence
        % transformations additional to the original sequence.
A=10; % Peak-to-average threshold value
A=10(A/20);
Nfft=512;   % IFFT sequence length
for i=1:N
x=randn(Nfft,Nm)/sqrt(2);   % Each column is an independent trial
% the first Nfft/2 rows represent the sum of Nfft/2 spaced samples
% and the others reprsent the difference between Nfft/2 spaced samples
% Sum of the samples and their difference are IID variables
y=ones(1,Nm);
M=Nfft/2;
x1=[x(1:M,:);x(1:M,:)];
x2=[x(M+1:Nfft,:);-x(M+1:Nfft,:)];
for M=Nfft*[0 1/8 1/4 3/8]
   x3=[x1((1+M):Nfft,:);x1(1:M,:)];
   z=x3+x2;
   y1=max(z)>A;
   y2=min(z)<-A;
   y=y&(y1|y2);
   if M==0
      n1 = n1 +sum(y);
   end;
   x3=flipud(x3);
   z=x3+x2;
   y1=max(z)>A;
   y2=min(z)<-A;
   y=y&(y1|y2);
end;
n=n+sum(y);
end;
n1=n1/N/Nm;
n=n/N/Nm;
```

We claim:

1. A method for reducing probability of clipping in an IFFT-based (inverse fast Fourier transform based) multitone communication transmitter, the method comprising:

applying an IFFT to an original sequence thereby to generate an IFFT output sequence;

if the IFFT output sequence fits a predetermined clipping profile, applying at least one transformation to the IFFT output sequence, thereby to define a transmitted sequence, the transformation-applying step comprising:

decomposing the IFFT output sequence into a first component sequence and a second component sequence;

rearranging at least one of the first and second component sequences with respect to the other, thereby to define third and fourth component sequences; and combining said third and fourth component sequences into a final output sequence.

2. A method according to claim 1 wherein said step of rearranging comprises translating one of the first and second component sequences with respect to the other along a time axis, thereby to define new component sequences, one of which is translated with respect to one of the first and second component sequences.

3. A method according to claim 2 wherein said step of rearranging also comprises reversing one of the new component sequences relative to the other.

4. A method according to claim 1 wherein said step of rearranging comprises reversing one of the first and second component sequences with respect to the other along a time axis, thereby to define new component sequences, one of which is reversed with respect to one of the first and second component sequences.

5. A method according to claim 3 wherein said step of rearranging also comprises translating one of the new component sequences relative to the other.

6. A method according to claim 1 wherein said first component comprises first initial and first subsequent subsequences of samples of equal length and wherein the values of the first initial subsequence of samples are respectively equal to the values of the first subsequent subsequence of samples, and wherein said second component comprises second initial and second subsequent subsequences of samples of equal length and wherein the values of the second initial subsequence of samples are respectively additive inverses of the values of the second subsequent subsequence of samples.

7. A method according to claim 6 wherein only one of the first subsequences is stored in memory and only one of the second subsequences is stored in memory.

8. A method according to claim 1 wherein said at least one transformation comprises at least one power preserving transformation.

9. A method according to claim 8 wherein said first component comprises first initial and first subsequent subsequences of samples of equal length and wherein the values of the first initial subsequence of samples are respectively equal to the values of the first subsequent subsequence of samples, and wherein said second component comprises second initial and second subsequent subsequences of samples of equal length and wherein the values of the second initial subsequence of samples are respectively additive inverses of the values of the second subsequent subsequence of samples.

10. A method according to claim 9 wherein said final sequence for transmission comprises a first sequence of samples and said comparison sequence comprises a second sequence of samples and wherein the first sequence of samples comprises a permutation of the second sequence of samples in which signs of none or all of the samples have been inverted.

11. A system according to claim 10 wherein said transformation comprises a plurality of transformations performed respectively on a plurality of subsequences of said preliminary digital output sequence, wherein said plurality of subsequences together forms a partition of said preliminary digital output sequence.

12. A method according to claim 1 wherein said transmitted sequence is characterized in that the original sequence is recovered by first applying an FFT to said transmitted sequence as received, thereby to generate an FFT output, and subsequently applying the inverse transformation, to the FFT output.

13. A method according to claim 12 wherein said first component comprises first initial and first subsequent subsequences of samples of equal length and wherein the values of the first initial subsequence of samples are respectively equal to the values of the first subsequent subsequence of samples, and wherein said second component comprises second initial and second subsequent subsequences of samples of equal length and wherein the values of the second initial subsequence of samples are respectively additive inverses of the values of the second subsequent subsequence of samples.

14. A method for reducing probability of clipping in an IFFT-based (inverse fast Fourier transform based) multitone communication transmitter, the method comprising:

applying an IFFT to an original sequence thereby to generate an IFFT output sequence; and if the IFFT output sequence fits a predetermined clipping profile, applying at least one transformation, having an inverse transformation, to the IFFT output sequence, thereby to define a final sequence for transmission characterized in that the original sequence is recovered by first applying an FFT to said final sequence as received, thereby to generate an FFT output and subsequently applying the inverse transformation, to the FFT output.

15. A method according to claim 14 wherein said at least one transformation comprises at least one power preserving transformation.

16. A method according to claim 14 wherein said if-applying step comprises applying first and second transformations to the IFFT output sequence without re-computing the IFFT between application of the first transformation and application of the second transformation.

17. A method according to claim 14 wherein said final sequence for transmission comprises a version of a comparison sequence generated by operating one of the following transformations: $t_1, t_2, t_3, t_4, t_5, t_6, t_7$ on said IFFT output sequence.

18. A method for reducing probability of clipping in an IFFT-based (inverse fast Fourier transform based) multitone communication transmitter, the method comprising:

at a transmitting end,
applying an IFFT to an original sequence thereby to generate an IFFT output sequence; and
if the IFFT output sequence fits a predetermined clipping profile, applying at least one transformation, having an inverse transformation, to the IFFT output sequence, thereby to define a final sequence for transmission; and at a receiving end,
recovering the original sequence by first applying an FFT to said final sequence as received, thereby to generate an FFT output and subsequently applying the inverse transformation, to the FFT output.

19. A method according to claim 18 wherein said clipping profile comprises an IFFT output sequence having at least one value exceeding a predetermined clipping threshold.

20. A method according to claim 18 wherein said at least one transformation comprises at least one power preserving transformation.

21. Receiver apparatus comprising:
an FFT unit operative to perform an FFT operation on an incoming sequence, thereby to generate an FFT interim sequence; and
a recovering transformation unit operative to perform a recovering transformation on said FFT interim sequence, wherein performance of said recovering transformation comprises:
computation of additive inverses of at least a portion of the samples within said FFT interim sequence, thereby to define a new interim sequence in which at least a portion of the samples are replaced by their additive inverses respectively.

22. Apparatus according to claim 21 wherein said recovering transformation also comprises a computation of complex conjugates of at least a portion of the samples in the new interim sequence.

23. Apparatus according to claim 21 wherein said portion of samples comprises a subsequence of samples within said FFT interim sequence wherein the intervals between the indices of samples within the subsequence are equal.

24. Receiver apparatus comprising:
an FFT unit operative to perform an FFT operation on an incoming sequence, thereby to generate an FFT interim sequence; and
a recovering transformation unit operative to perform a recovering transformation on said FFT interim sequence, wherein performance of said recovering transformation comprises:
computation of complex conjugates of at least a portion of the samples within said FFT interim sequence.

25. A method for reducing probability of clipping in an IFFT-based (inverse fast Fourier transform based) multitone communication transmitter, the method comprising:
applying an IFFT to an original sequence thereby to generate an IFFT output sequence; and
if the IFFT output sequence fits a predetermined clipping profile, applying at least one power preserving transformation to the IFFT output sequence, thereby to define a transmitted sequence for transmission to a remote terminal.

26. A method for reducing probability of clipping in an IFFT-based (inverse fast Fourier transform based) multitone communication transmitter, the method comprising:
applying an IFFT to an original sequence thereby to generate an IFFT output sequence; and
if the IFFT output sequence fits a predetermined clipping profile, applying at least one power preserving transformation to the IFFT output sequence, thereby to define a transmitted sequence for transmission to a remote terminal,
wherein said transmitted sequence is characterized in that said original sequence is derived from said transmitted sequence by applying an FFT which is an inverse of said IFFT, thereby to define an FFT output sequence, and subsequently performing an inverse of said at least one power preserving transformation on said FFT output sequence.

27. A method according to claim 26 wherein said inverse of said at least one power preserving transformation does not include multiplication operations.

28. A method according to claim 26 wherein said inverse of said at least one power preserving transformation includes no addition/subtraction operations other than computation of additive inverses.

29. A method according to claim 26 wherein said FFT output sequence comprises a plurality of FFT output components and wherein said inverse of said at least one power preserving transformation includes computation of an additive inverse pertaining to at least one of said plurality of FFT output components.

30. A method according to claim 29 wherein said plurality of FFT output components comprises at least one complex FFT output component having an imaginary part and a real part and wherein said computation of an additive inverse comprises compu- tation of an additive inverse of at least one of said imaginary and real parts.

31. A method for reducing probability of clipping in an IFFT-based (inverse fast Fourier transform based) multitone communication transmitter, the method comprising:
applying an IFFT to an original sequence thereby to generate an IFFT output sequence; and
if the IFFT output sequence fits a predetermined clipping profile, applying at least one power preserving transformation to the IFFT output sequence, thereby to define a transmitted sequence for transmission to a remote terminal, wherein the transmitted sequence comprises a combination of a first permutation of a first component sequence and a second permutation of a second component sequence wherein said first and second component sequences, when combined, yield said IFFT output sequence.

32. A method for reducing probability of clipping in an IFFT-based (inverse fast Fourier transform based) multitone communication transmitter, the method comprising:

applying an IFFT to an original sequence thereby to generate an IFFT output sequence; and if the IFFT output sequence fits a predetermined clipping profile, applying at least one power preserving transformation to the IFFT output sequence, thereby to define a transmitted sequence for transmission to a remote terminal, wherein the transformation-applying step comprises:
decomposing the IFFT output sequence into a first component sequence and a second component sequence;
rearranging at least one of the first and second component sequences with respect to the other, thereby to define third and fourth component sequences; and
combining said third and fourth component sequences.

33. A system for reducing probability of clipping in a multitone communication transmitter, the system comprising:

a multichannel modulator operative to generate a preliminary digital output sequence;

a transformation unit operative, if the preliminary digital output sequence fits a predetermined clipping profile, to apply at least one invertible non-linear transformation to the preliminary digital output sequence, thereby to define a transmitted sequence, the transformation unit comprising:
a decomposer operative to decompose the preliminary digital sequence into a first component sequence and a second component sequence;
a sequence rearranging unit operative to rearrange at least one of the first and second component sequences with respect to the other, thereby to define third and fourth component sequences; and
a final output sequence generator operative to combine said third and fourth component sequences into a final output sequence.

34. A system according to claim 33 wherein all of the plurality of transformations are linear and wherein at least one transformation from among said plurality of transformations is different from at least one other transformation from among said plurality of transformations.

35. A method for reducing probability of clipping in a multitone communication transmitter, the method comprising:

generating a preliminary digital output sequence;

if the preliminary digital output sequence fits a predetermined clipping profile, applying at least one invertible non-linear transformation to the preliminary digital output sequence, thereby to define a transmitted sequence, the if-applying step comprising:
decomposing the preliminary digital sequence into a first component sequence and a second component sequence;
rearranging at least one of the first and second component sequences with respect to the other, thereby to define third and fourth component sequences; and
combining said third and fourth component sequences into a final output sequence.

36. Receiver apparatus comprising:

an FFT unit operative to perform an FFT operation on an incoming sequence, thereby to generate an FFT interim sequence; and a recovering transformation unit operative to perform a recovering transformation on said FFT interim sequence, wherein performance of said recovering transformation comprises:
computation of complex conjugates of at least a portion of the samples within said FFT interim sequence,
wherein said portion of the samples comprises a subsequence of samples within said FFT interim sequence wherein the intervals between the indices of samples within the subsequence are equal.

37. A method for controlling the output power of an IFFT-based multitone communication transmitter, the method comprising:

applying an IFFT to an original sequence thereby to generate an IFFT output sequence;

applying at least one transformation to the IFFT output sequence, thereby to define one or more transformed sequences, the transformation-applying step comprising:
decomposing the IFFT output sequence into a first component sequence and a second component sequence;
rearranging at least one of the first and second component sequences with respect to the other, thereby to define third and fourth component sequences; and
combining said third and fourth component sequences into a final output sequence; and responsive to a predetermined criterion, selecting for transmission either the IFFT output sequence or one of the transformed sequences.

38. A method according to claim 37, wherein said step of rearranging comprises translating one of the first and second component sequences with respect to the other along a time axis, thereby to define new component sequences, one of which is translated with respect to one of the first and second component sequences.

39. A method according to claim 37, wherein said step of rearranging comprises reversing one of the first and second component sequences with respect to the other along a time axis, thereby to define new component sequences, one of which is reversed with respect to one of the first and second component sequences.

40. A method according to claim 37, wherein said at least one transformation comprises at least one power preserving transformation.

41. A method according to claim 40, wherein said first component comprises first initial and first subsequent subsequences of samples of equal length and wherein the values of the first initial subsequence of samples are respectively equal to the values of the first subsequent subsequences of samples, and wherein said second component comprises second initial and second subsequent subsequences of samples of equal length and wherein the values of the second initial subsequence of samples are respectively additive inverses of the values of the second subsequent subsequence of samples.

42. A method according to claim 37, wherein said transformed sequence is characterized in that the original sequence is recovered by first applying an FFT to said transformed sequence as received, thereby to generate an FFT output, and subsequently applying the inverse transformation to the FFT output.

43. A method for controlling the output power of an IFFT-based multitone communication transmitter, the method comprising:

applying an IFFT to an original sequence thereby to generate an IFFT output sequence;

applying at least one transformation, having an inverse transformation, to the IFFT output sequence, thereby to define one or more transformed sequences characterized in that the original sequence is recovered by first applying an FFT to said transformed sequence as received, thereby to generate an FFT output, and subsequently applying the inverse transformation to the FFT output; and responsive to a predetermined criterion, selecting for transmission either the IFFT output sequence or one of the transformed sequences.

44. A method according to claim 43, wherein said at least one transformation comprises at least one power preserving transformation.

45. A method for controlling the output power of an IFFT-based multitone communication transmitter, the method comprising:

at a transmitting end,
applying an IFFT to an original sequence, thereby to generate an IFFT output sequence;

applying at least one transformation, having an inverse transformation, to the IFFT output sequence, thereby to define one or more transformed sequences; and responsive to a predetermined criterion, selecting for transmission either the IFFT output sequence or one of the transformed sequences; and at a receiving end, recovering the original sequence by first applying an FFT to said transmitted sequence as received, thereby to generate an FFT output and subsequently, if one of the transformed sequences was selected for transmission, applying the inverse transformation to the FFT output.

46. A method according to claim 45, wherein said at least one transformation comprises at least one power preserving transformation.

47. A method for controlling the output power of an IFFT-based (inverse fast Fourier transform based) multitone communication transmitter, the method comprising:

applying an IFFT to an original sequence thereby to generate an IFFT output sequence;

applying at least one power preserving transformation to the IFFT output sequence, thereby to define one or more transformed sequences; and responsive to a predetermined criterion, selecting for transmission to a remote terminal either the IFFT output sequence or one of the transformed sequences, wherein said transformed sequences are characterized in that said original sequence is derived from said transformed sequences by applying an FFT which is an inverse of said IFFT, thereby to define an FFT output sequence, and subsequently performing an inverse of said at least one power preserving transformation on said FFT output sequence.

48. A system for controlling the output power of a multitone communication transmitter, the system comprising:

a multichannel modulator operative to generate a preliminary digital output sequence;

a transformation unit operative to apply at least one invertible non-linear transformation to the preliminary digital output sequence, thereby to define one or more transformed sequences, the transformation unit comprising:

a decomposer operative to decompose the preliminary digital sequence into a first component sequence and a second component sequence;

a sequence rearranging unit operative to rearrange at least one of the first and second component sequences with respect to the other, thereby to define third and fourth component sequences; and a final sequence generator operative to combine said third and fourth component sequences into a final transformed sequence; and a multiplexer, which is operative to select for transmission either the IFFT output sequence or one of the transformed sequences responsive to a predetermined criterion.

49. A method for controlling the output power of a multitone communication transmitter, the method comprising:

generating a preliminary digital output sequence;

applying at least one invertible non-linear transformation to the preliminary digital output sequence, thereby to define one or more transformed sequences, said transformation comprising:

decomposing the preliminary digital sequence into a first component sequence and a second component sequence;

rearranging at least one of the first and second component sequences with respect to the other, thereby to define third and fourth component sequences; and combining said third and fourth component sequences into a final transformed sequence; and responsive to a predetermined criterion, selecting for transmission either the preliminary digital output sequence or one of the transformed sequences.

50. Transmitter apparatus, comprising:

an IFFT unit, adapted to apply an IFFT to an original multitone sequence for transmission, thereby to generate an IFFT output sequence;

a comparator, adapted to compare a characteristic of the IFFT output sequence to a predetermined criterion;

a transformation generator, adapted to apply at least one transformation, having an inverse transformation, to the IFFT output sequence, thereby to define one or more transformed sequences characterized in that the original sequence is recovered by first applying an FFT to said final sequence as received, thereby to generate an FFT output and subsequently applying the inverse transformation to the FFT output; and a multiplexer, adapted to select for transmission either the IFFT output sequence or one of the transformed sequences responsive to the comparison performed by the comparator.

51. Apparatus according to claim 50, wherein the characteristic comprises a magnitude of the IFFT output sequence.

* * * * *